United States Patent
Himmelmann (10) Patent No.: US 8,933,576 B2
(45) Date of Patent: Jan. 13, 2015

(54) HYBRID FRICTION WHEEL GEARBOX DRIVETRAIN FOR WIND TURBINE APPLICATIONS

(75) Inventor: Richard A. Himmelmann, Beloit, WI (US)

(73) Assignee: United Technologies Corporation, Hartford, CT (US)

( * ) Notice: Subject to any disclaimer, the term of this patent is extended or adjusted under 35 U.S.C. 154(b) by 213 days.

(21) Appl. No.: 13/462,257

(22) Filed: May 2, 2012

(65) Prior Publication Data

US 2013/0292946 A1 Nov. 7, 2013

(51) Int. Cl.
*F03D 9/00* (2006.01)
*H02P 9/04* (2006.01)
*F03D 11/02* (2006.01)

(52) U.S. Cl.
CPC .......... *F03D 11/02* (2013.01); *F05B 2260/402* (2013.01); *F05B 2240/40* (2013.01); *Y02E 10/722* (2013.01)
USPC .......................................................... 290/55

(58) Field of Classification Search
CPC ............... F03D 11/02; F05B 2260/402; F05B 2240/40; Y02E 10/722
USPC ......................................... 290/55, 54, 44, 43
See application file for complete search history.

(56) References Cited

U.S. PATENT DOCUMENTS

| | | |
|---|---|---|
| 501,587 A | 7/1893 | Gleason |
| 569,632 A | 10/1896 | Garrood |
| 624,492 A | 5/1899 | Hoffman |
| 2,233,039 A | 2/1947 | Vianzone |
| 2,428,060 A | 9/1947 | Albrecht |
| 2,655,604 A | 10/1953 | Hütter |
| 3,278,000 A | 10/1966 | I'Anson |
| 4,025,724 A | 5/1977 | Davidson, Jr. et al. |
| 4,334,823 A | 6/1982 | Sharp |
| 4,423,333 A | 12/1983 | Rossman |
| 4,653,982 A | 3/1987 | Kojima et al. |
| 4,795,408 A | 1/1989 | Kotegawa et al. |
| 4,915,511 A | 4/1990 | Kotegawa et al. |
| 5,183,386 A | 2/1993 | Feldman et al. |
| 5,562,558 A | 10/1996 | Kubota |
| 5,806,653 A | 9/1998 | Ahls et al. |

(Continued)

FOREIGN PATENT DOCUMENTS

| | | |
|---|---|---|
| DE | 619328 | 9/1935 |
| EP | 2221476 A1 | 8/2010 |
| JP | 06102886 | 4/1994 |

OTHER PUBLICATIONS

International Search Report and Written Opinion for related International Application No. PCT/US13/36562; report dated Jul. 24, 2013.

*Primary Examiner* — Javaid Nasri
(74) *Attorney, Agent, or Firm* — Miller, Matthias & Hull LLP (57) ABSTRACT

A drivetrain for a wind turbine is provided. The drivetrain may include a first stage speed increaser adapted for low speed operations, and a second stage speed increaser adapted for moderate and high speed operations. The first stage speed increaser may include at least one drive wheel being rotatably driven by a main shaft of the wind turbine and at least one driven wheel in frictional communication with the drive wheel. The second stage speed increaser may include a gearbox coupled to each driven wheel and a generator coupled to each gearbox.

20 Claims, 9 Drawing Sheets

(56) References Cited

U.S. PATENT DOCUMENTS

| | | |
|---|---|---|
| 5,823,686 A | 10/1998 | Murano et al. |
| 6,070,711 A | 6/2000 | Murano et al. |
| 6,102,573 A | 8/2000 | Morimoto et al. |
| 6,367,982 B1 | 4/2002 | Doi et al. |
| 6,465,901 B2 | 10/2002 | Croes |
| 6,685,588 B2 | 2/2004 | Doi et al. |
| 6,742,935 B2 | 6/2004 | Saji |
| 6,855,080 B2 | 2/2005 | Kanehira et al. |
| 6,979,171 B2 | 12/2005 | Lauritsen |
| 7,182,573 B2 | 2/2007 | Jonsson |
| 7,198,469 B2 | 4/2007 | Travere |
| 7,276,808 B2 | 10/2007 | Weitkamp et al. |
| 7,296,971 B2 | 11/2007 | Borgen |
| 7,365,447 B2 | 4/2008 | Yoshida |
| 7,605,489 B1 | 10/2009 | Blank et al. |
| 7,612,462 B2 | 11/2009 | Viterna |
| 7,771,158 B2 | 8/2010 | Grassi |
| 7,789,624 B2 | 9/2010 | Appa et al. |
| 7,902,689 B2 | 3/2011 | Kinzie et al. |
| 7,945,350 B2 | 5/2011 | Kinzie et al. |
| 7,956,482 B2 | 6/2011 | Nies et al. |
| 8,502,403 B2 * | 8/2013 | Merswolke et al. ............ 290/44 |
| 2005/0238489 A1 | 10/2005 | Lund |
| 2006/0275121 A1 | 12/2006 | Merswolke et al. |
| 2008/0196967 A1 | 8/2008 | Breitbach et al. |
| 2008/0298967 A1 | 12/2008 | Matesanz et al. |
| 2009/0097976 A1 | 4/2009 | Driver et al. |
| 2009/0149999 A1 | 6/2009 | Schramm et al. |
| 2009/0223164 A1 | 9/2009 | Cook et al. |
| 2009/0230686 A1 | 9/2009 | Catlin |
| 2010/0248880 A1 | 9/2010 | Fujiwara et al. |
| 2010/0314884 A1 | 12/2010 | Ollgaard et al. |
| 2011/0058956 A1 | 3/2011 | Zuteck |
| 2011/0133453 A1 | 6/2011 | Merswolke et al. |
| 2011/0135471 A1 | 6/2011 | Wangford |
| 2011/0156393 A1 | 6/2011 | Wakasa et al. |

\* cited by examiner

HYBRID FRICTION WHEEL GEARBOX DRIVETRAIN FOR WIND TURBINE APPLICATIONS

FIELD OF THE DISCLOSURE

The present disclosure generally relates to wind turbines, and more particularly, relates to a gearbox drivetrain for wind turbine applications.

BACKGROUND OF THE DISCLOSURE

Utility-scale wind turbines generally include a set of two or three rotor blades which radially extend from a rotor hub. The combined assembly of the rotor blades and the rotor hub is referred to as the rotor. The rotor blades aerodynamically interact with wind energy, creating lift and drag, which the rotor hub then translates into a driving torque. The driving torque is communicated from the rotor hub through a main shaft that is coupled to the rotor hub. The rotational torque is then distributed to one or more generators via a drivetrain, which in turn produce electric power to be processed and transmitted to an associated electrical grid. The main shaft, the drivetrain and the generators are all situated within a nacelle that is located on top of a tower.

The typical cost of manufacturing, implementing and maintaining a wind turbine is largely driven by the size and mass of the physical hardware disposed within the nacelle. Such costs may be reduced by minimizing the size and mass of, for instance, the drivetrain, the generator system, as well as any housing assemblies and support structures therefor. One way to reduce the size of a wind turbine generator is to increase the operating or drive speed of the generator. Furthermore, in order to increase the generator speed, some form of a speed increaser or related gearbox is required to convert typically low rotational speeds of the main shaft into a higher speed suitable for driving a relatively small generator. While prior advances have led to certain accommodations for such implementations, there is still much room for improvement.

In a conventional gearbox, a relatively small number of gear teeth are meshed between gears so as to communicate an input torque at a drive gear to an output torque at a driven gear. In the presence of substantially high rotational torque as with wind turbine applications, however, the gear teeth are continuously subjected to significant levels of localized forces and stresses during normal operation. As a result, the physical size and mass of the hardware, including the gear set, associated housing assemblies and support structures of speed increasing gearboxes, must be sufficiently large to accommodate for such forces, which undesirably adds to the overall cost. Furthermore, such gearbox installations are relatively more susceptible to gear misalignment. In wind turbine applications, large loads received in response to strong and/or sudden gusts of wind, for example, may directly and negatively impact gear alignment. As such, currently existing systems critically require precise bearing locations on the input stage of the wind turbine as well as stiffer, or larger and heavier, gearbox housing assemblies in order to sufficiently compensate for such high loads. However, providing such measures further adds to the size and mass of the gearbox and the drivetrain, which in turn, further adds to the overall cost of implementation.

Accordingly, it would be beneficial to provide a drivetrain which reduces the costs associated with manufacturing, implementing and maintaining wind turbines while improving upon or at least maintaining the performance and efficiency of currently existing installations. Moreover, there is a need for a drivetrain for a wind turbine which combines a more efficient and reliable first stage speed increaser with a lighter and more cost-effective second stage speed increaser. In particular, there is a need for a friction-based first stage speed increaser which eliminates the need for large generators and increases the tolerance to misalignment without compromising performance or efficiency. There is also a need for a first stage speed increaser which distributes large rotational torque over a wider area so as to eliminate localized stresses on components of the drivetrain. Furthermore, there is a need for a second stage speed increaser which eliminates the need for a relatively large gearbox and is adapted for use with smaller, more conventional gearbox assemblies.

SUMMARY OF THE DISCLOSURE

In accordance with one aspect of the present disclosure, a drivetrain for a wind turbine is provided. The drivetrain may include a first stage speed increaser adapted for low speed operations, and a second stage speed increaser adapted for moderate and high speed operations. The first stage speed increaser may include at least one drive wheel being rotatably driven by a main shaft of the wind turbine and at least one driven wheel in frictional communication with the drive wheel. The second stage speed increaser may include a gearbox coupled to each driven wheel and a generator coupled to each gearbox.

In accordance with another aspect of the present disclosure, a drivetrain for a wind turbine is provided. The drivetrain may include at least one drive wheel rotatably driven by a main shaft of the wind turbine, at least one driven wheel forming a friction interface with and being rotatably driven by the drive wheel, at least one gearbox coupled to each driven wheel, and at least one generator coupled to each gearbox.

In accordance with yet another aspect of the present disclosure, a wind turbine is provided. The wind turbine may include a hub, a main shaft rotating with the hub, and a drivetrain coupled to the main shaft. The drivetrain may include a first stage speed increaser adapted for low speed operations, and a second stage speed increaser adapted for moderate and high speed operations. The first stage speed increaser may include a drive wheel being driven by the main shaft and a plurality of driven wheels in frictional communication with the drive wheel. The second stage speed increaser may include a gearbox coupled to each driven wheel and a generator coupled to each gearbox.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail on the accompanying drawings, wherein.

While the following detailed description has been given and will be provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims eventually appended hereto.

DETAILED DESCRIPTION OF THE DISCLOSURE

Figure 1:
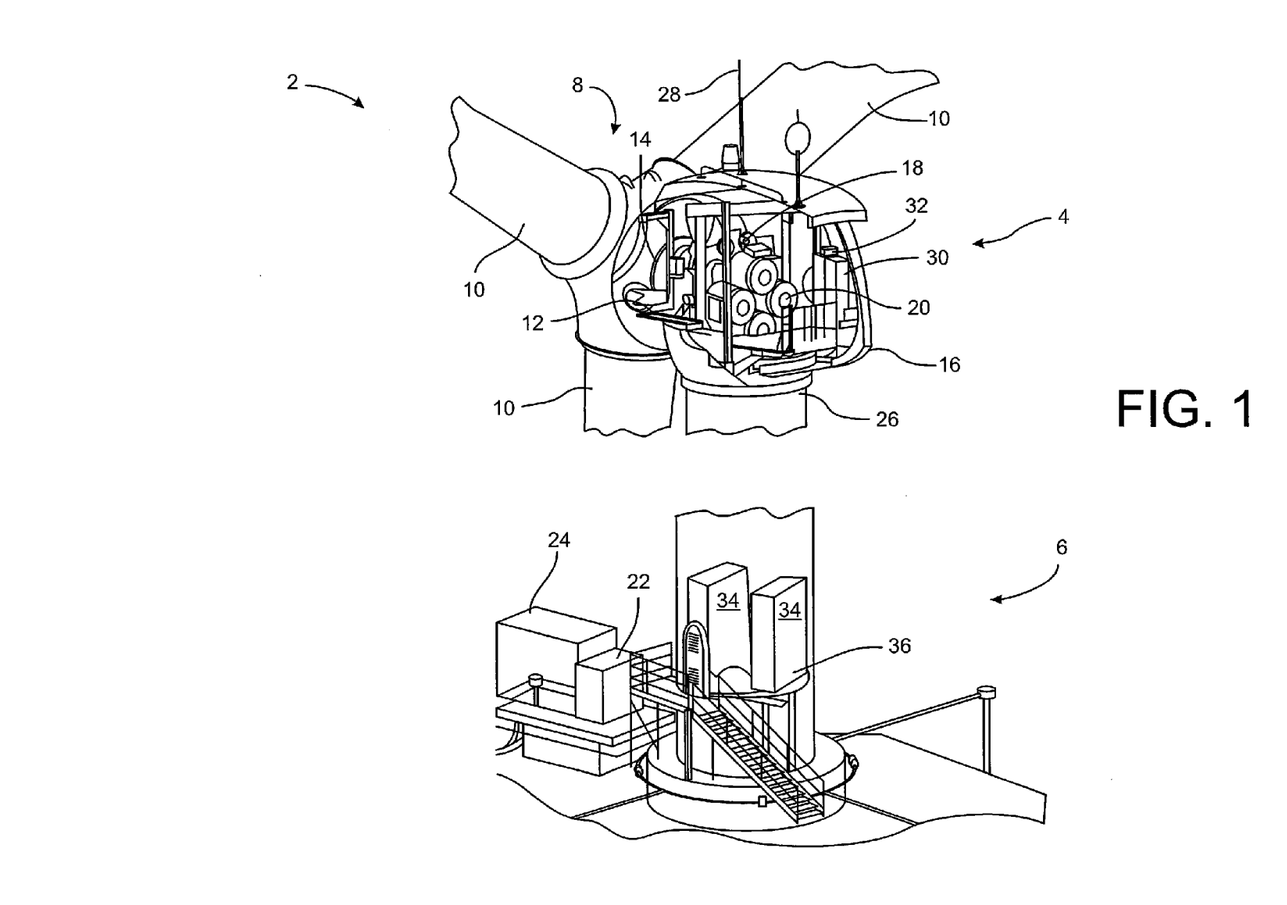
FIG. 1 is a schematic illustration of a wind turbine, in accordance with at least some embodiments of the present disclosure.

Referring to FIG. 1, an exemplary wind turbine 2 is shown, in accordance with at least some embodiments of the present disclosure. While all the components of the wind turbine have not been shown and/or described, a typical wind turbine may include an uptower section 4 and a downtower section 6. The uptower section 4 may include a rotor 8, which in turn may include a plurality of blades 10 connected to a hub 12. The blades 10 may rotate with wind energy and the rotor 8 may transfer that energy to a main shaft 14 situated within a nacelle 16. The nacelle 16 may additionally include a drivetrain 18 (e.g., a friction wheel drivetrain), which may connect the main shaft 14 on one end to one or more generators 20 on the other end. The generators 20 may generate power, which may be transmitted from the uptower section 4 through the downtower section 6 to a power distribution panel (PDP) 22 and a pad mount transformer (PMT) 24 for transmission to a grid (not shown). The PDP 22 and the PMT 24 may also provide electrical power from the grid to the wind turbine for powering several components thereof.

In addition to the components of the wind turbine 2 described above, the uptower section 4 of the wind turbine may include several auxiliary components, such as, a yaw system 26 on which the nacelle 16 may be positioned to pivot and orient the wind turbine in a direction of the prevailing wind current or another preferred wind direction, a pitch control unit (PCU) (not visible) situated within the hub 12 for controlling the pitch (e.g., angle of the blades with respect to the wind direction) of the blades 10, a hydraulic power system (not visible) to provide hydraulic power to various components such as brakes of the wind turbine, a cooling system (also not visible), a lightning rod 28 for protecting the wind turbine from lightning strikes, and the like. Notwithstanding the auxiliary components of the wind turbine 2 described above, it will be understood that the wind turbine 2 may include several other auxiliary components that are contemplated and considered within the scope of the present disclosure. Furthermore, a turbine control unit (TCU) 30 and a control system 32 (one or both of which may be classified as auxiliary components) may be situated within the nacelle 16 for controlling the various components of the wind turbine 2.

With respect to the downtower section 6 of the wind turbine 2, among other components, may include a pair of generator control units (GCUs) 34 and a downtower junction box (DJB) 36 for routing and distributing power between the wind turbine and the grid. While in the present embodiment, a pair of the GCUs 34 has been shown, in at least some embodiments, the number of the GCUs may vary from a single unit to possibly more than two as well. In addition, several other components, such as, ladders, access doors, etc., that may be present within the downtower section 6 of the wind turbine 2 are contemplated and considered within the scope of the present disclosure.

Figure 8:
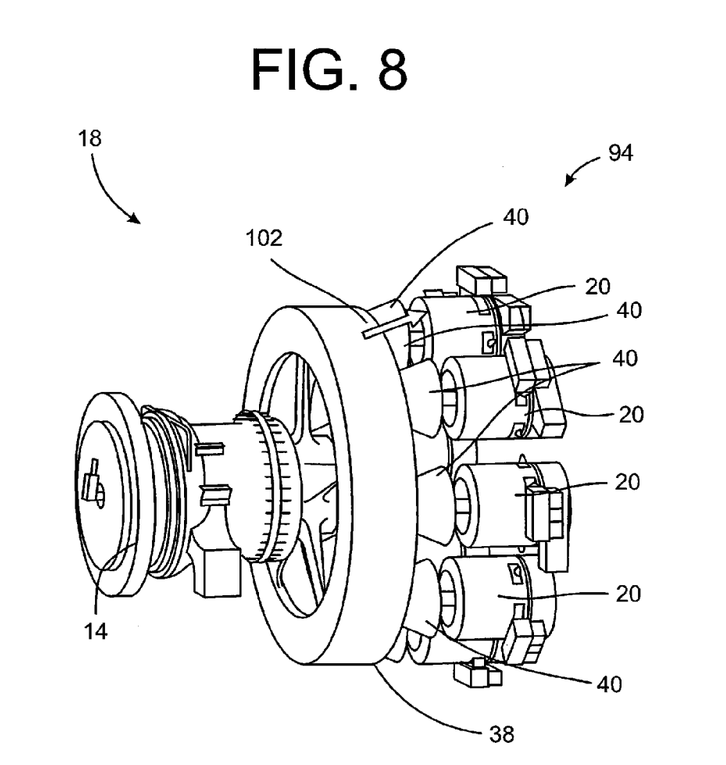
FIGS. 8, and 9 show a fourth embodiment of the variable speed friction wheel drivetrain for use within the wind turbine of FIG. 1.
Figure 8A:
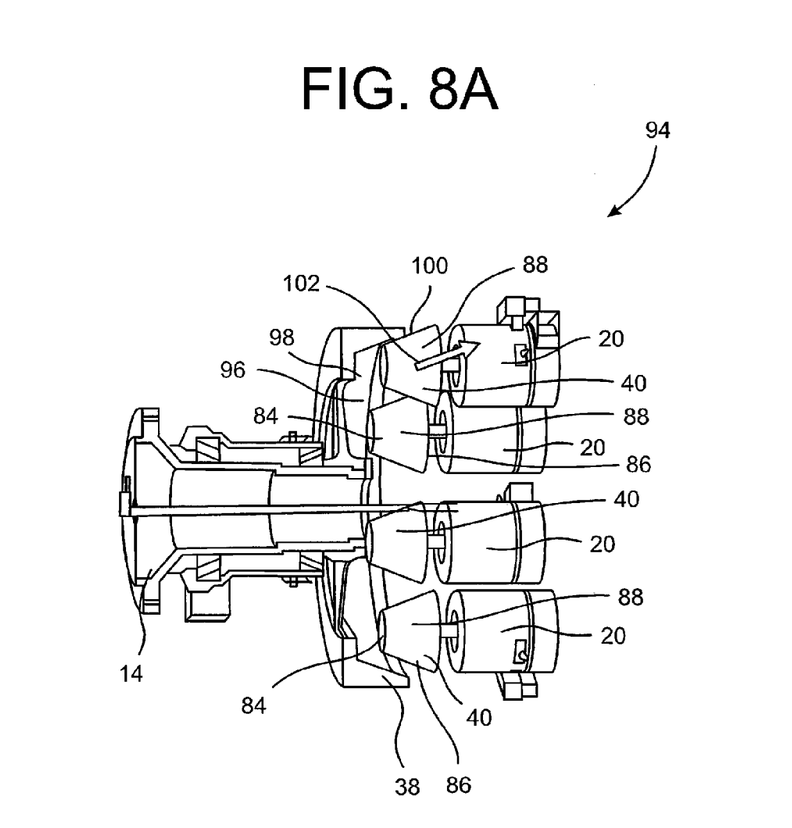
FIGS. 8A and 9A show cross-sectional cut-away views of FIGS. 8 and 9, respectively.
Figure 9:
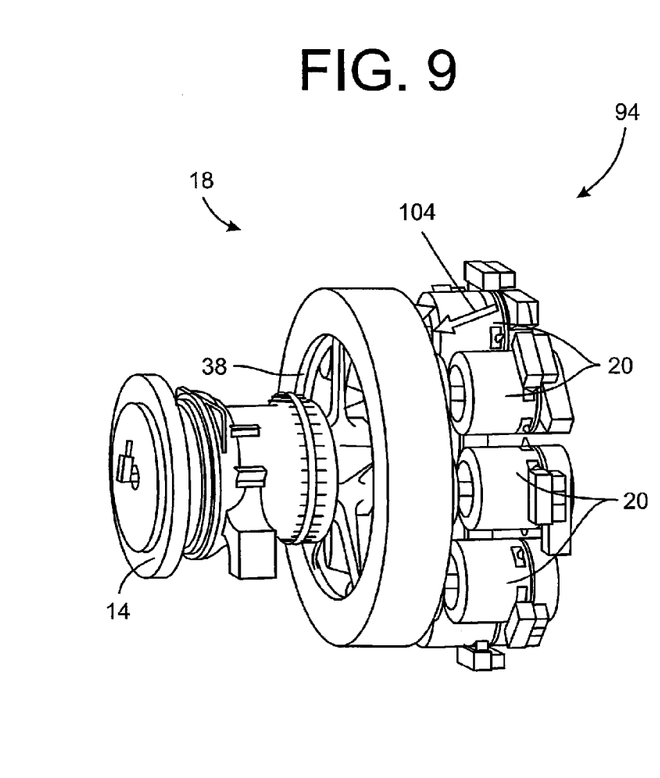
Figure 9A:
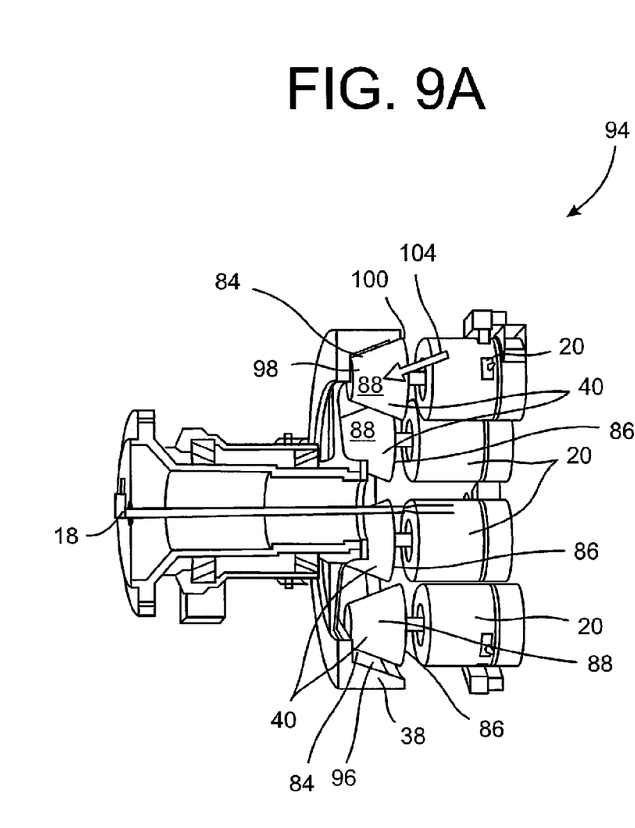
Figure 10:
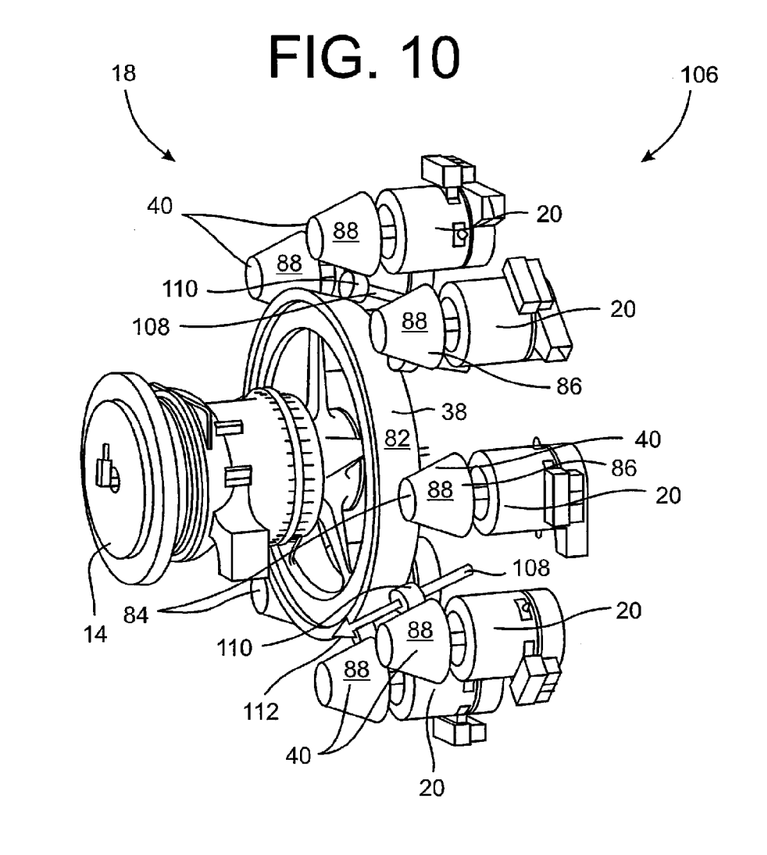
FIGS. 10 and 11 show a fifth embodiment of the variable speed friction wheel drivetrain for use within the wind turbine of FIG. 1.
Figure 11:
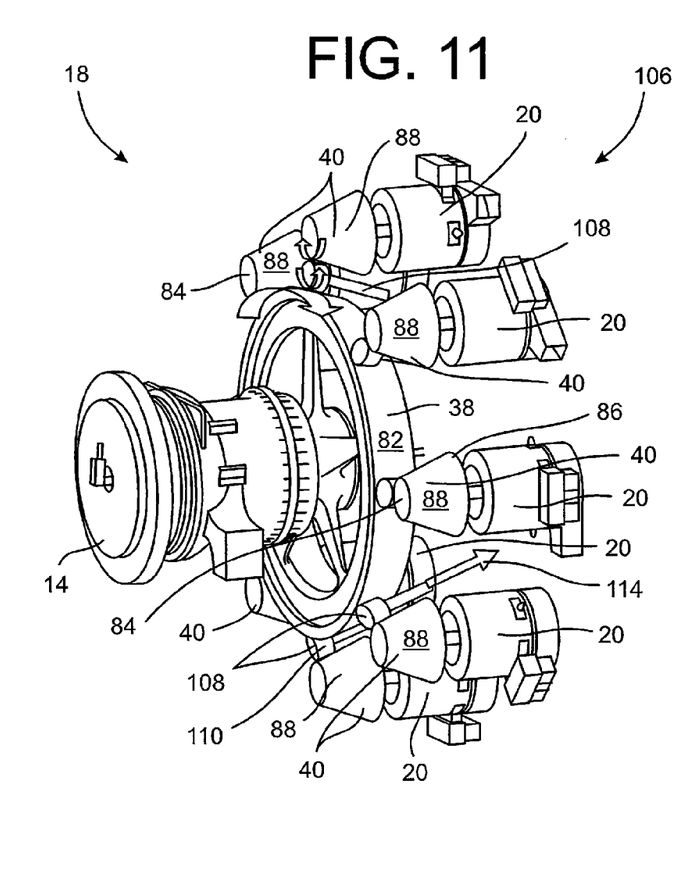

Turning now to FIGS. 2-11, several embodiments of the drivetrain 18 are shown, in accordance with at least some embodiments of the present disclosure. Specifically, FIGS. 2 and 3, 4 and 5, 6 and 7 show first, second, third embodiments, respectively, of the drivetrain 18, while FIGS. 8, 8A, 9 and 9A show a fourth embodiment of the drivetrain. FIGS. 10 and 11 show a fifth embodiment of the drivetrain 18. Referring now generally to all of FIGS. 2-11 and as shown, the drivetrain 18 is a friction wheel drivetrain and particularly, a variable speed ratio friction wheel drivetrain having a drive wheel 38 (also referred to herein as a driving wheel) mounted onto the main shaft 14 and driving a plurality of driven wheels 40 positioned about the drive wheel 38. The drivetrain 18 employs friction to transfer power from the drive wheel 38 to the driven wheels 40. Furthermore, the embodiments of FIGS. 2-11 show a single stage variable speed ratio speed increaser friction wheel drivetrain having one drive wheel 38 and a set of driven wheels 40.

Although the drivetrains 18 of FIGS. 2-11 may depict a single stage speed increaser, in at least some other embodiments, the drivetrain 18 may include a multi-stage speed increaser. For example, in addition to the single stage speed increaser shown for low speed operations, the drivetrain 18 may provide a second stage to the speed increaser through one or more gear sets configured for moderate to high speed operations, as will be discussed in further detail below. In other alternatives, the drivetrain 18 may provide a multi-stage variable speed ratio speed increaser that employs multiple sets of the drive wheel 38 and the driven wheels 40. For instance, in a dual stage speed increaser, the drive wheel 38 may drive the driven wheels 40, which in turn may be coupled to a second drive wheel (e.g., the driven wheels being rotatably fitted between the two drive wheels), and the second drive wheel may drive a still further set of driven wheels. Depending upon the number of stages of speed increase desired, the number of the stages (each stage having one set of driving and driven wheels) of the drive wheel 38 and the driven wheels 40 may vary as well. Furthermore, while the present embodiment depicts only a single drive wheel 38 which drives a plurality of driven wheels 40, this is merely exemplary. In other embodiments, more than one drive wheel 38 may be employed to drive a multiple number of the driven wheels 40. In still further alternatives, one or more drive wheels 38 may be used to drive a single driven wheel 40.

Additionally, the drive wheel 38 and the driven wheels 40 may be formed of any of a variety of materials commonly used for friction wheels. For example, in some embodiments, one or both of the drive and driven wheels 38, 40 may be constructed of steel (e.g., polished steel or machined steel). While constructing each of the drive and driven wheels 38, 40 of steel may advantageously transmit power with greater efficiency, in at least some other embodiments, one or both of the drive and the driven wheels 38, 40 may be constructed of other materials, such as, rubber, wood, plastic, or the like. In yet other embodiments, depending upon the efficiency, wheel lifespan, cost and power requirements that are desired, other types of materials may be employed as well for constructing one or both of the drive wheel 38 and the driven wheels 40.

With respect to the size of the drive wheel 38 and the driven wheels 40, it may vary as well, depending particularly upon the speed ratio of the drivetrain 18 that is desired. As stated above, the drivetrain 18 (e.g., the friction wheel drivetrain) is a variable speed ratio speed increaser friction wheel, or a drivetrain capable of increasing (or decreasing) the rotational speed of the rotor 8 to provide a constant output rotational speed for driving the one or more generators 20. In other words, the drivetrain 18, and particularly, the driven wheels 40 may be capable of supplying a constant output rotational speed, independent of the input rotational speed of the main shaft 14 that drives the drive wheel 38. Thus, depending upon the ratio of the input rotational speed to the output rotational speed (also referred to herein as speed ratio) that is desired, the size of the drive wheel 38 and the driven wheels 40 may vary in order to provide a constant output rotational speed for a given input rotational speed. Generally speaking, by varying the effective circumference of the drive wheel 38 and the driven wheels 40 and the contact location therebetween, a desired speed ratio may be obtained. The shape of the drive wheel 38 and/or the driven wheels 40 may vary as well, as described further below.

Referring still to FIGS. 2-11 in general, each of the driven wheels 40 may be further coupled to a generator 20. As shown, eight of the driven wheels 40 drive eight of the generators 20. In other embodiments, more or less than eight driven wheels 40 and generators 20 may be employed. As also shown, the driven wheels 40 may be arranged symmetrically about a rotational axis of the drive wheel 38 and the main shaft 14. "Symmetrical" as used herein may describe the relative positioning of the driven wheels 40 with respect to the drive wheel 38 and the main shaft 14 such that the positioning of these components creates complementary forces on the main shaft and the drive wheel 38. Aside from the symmetrical arrangement of the driven wheels 40 described above, it will be understood that the driven wheels 40 may be arranged in any other suitable configuration. In at least some embodiments, for instance, the driven wheels 40 may be positioned in a non-symmetrical arrangement about the drive wheel 38 and the main shaft 14.

In operation, when the drive wheel 38 is rotated by the wind turbine 2 (e.g., by the rotor 8 and the main shaft 14), and the driven wheels 40 are forced (e.g., rotated and/or translated) against the drive wheel 38, rotational motion from the drive wheel 38 is transferred to the driven wheels 40 and torque from the drive wheel 38 is split into multiple pathways to the driven wheels 40. For an x number of the driven wheels 40 that may be employed for each one of the drive wheel 38, the torque may be split into x number of pathways. By splitting the torque, it may be possible to achieve a reduction in the overall force that is exerted on the main shaft 14 and the bearings associated therewith. Such load reductions on the bearings of the main shaft may help ensure the longevity of the drivetrain 18 and/or reduce costs associated with bearings. Furthermore, by rotating and/or translating the driven wheels 40 against the drive wheel 38, an increase or a decrease in the desired speed ratio may be achieved, thereby providing a variable speed ratio speed increaser.

For a desired generator speed that is about ten times the speed of the rotor 8, the size of the driven wheels 40 may be nominally selected to be, for example, about ten times smaller than the size of the drive wheel 38. The nominal size of both the drive wheel 38 and the driven wheels 40 may be measured at the average diameter of the respective wheel. As the rotational speed of the rotor 8 falls below its nominal rated speed, the generator speed may begin to proportionally decrease. To mitigate the generator speed reduction, the speed ratio of the drivetrain 18 may be increased by translating the driven wheels 40 against the drive wheel 38, until the generator speed accelerates to its desired operating speed. Similarly, if the rotational speed of the rotor 8 exceeds its nominal rated speed, the generator speed may begin to proportionally increase. To mitigate the generator speed increase, the speed ratio of the drivetrain 18 may be decreased by translating the driven wheels 40 against the drive wheel 38, until the generator speed decelerates to its desired operating speed. Thus, by translating the driven wheels 40 and the drive wheel 38 relative to one another, a constant rotational speed of the generators 20 may be achieved. Various embodiments of varying (e.g., increasing or decreasing) the speed ratio are described below in FIGS. 2-11.

Figure 2:
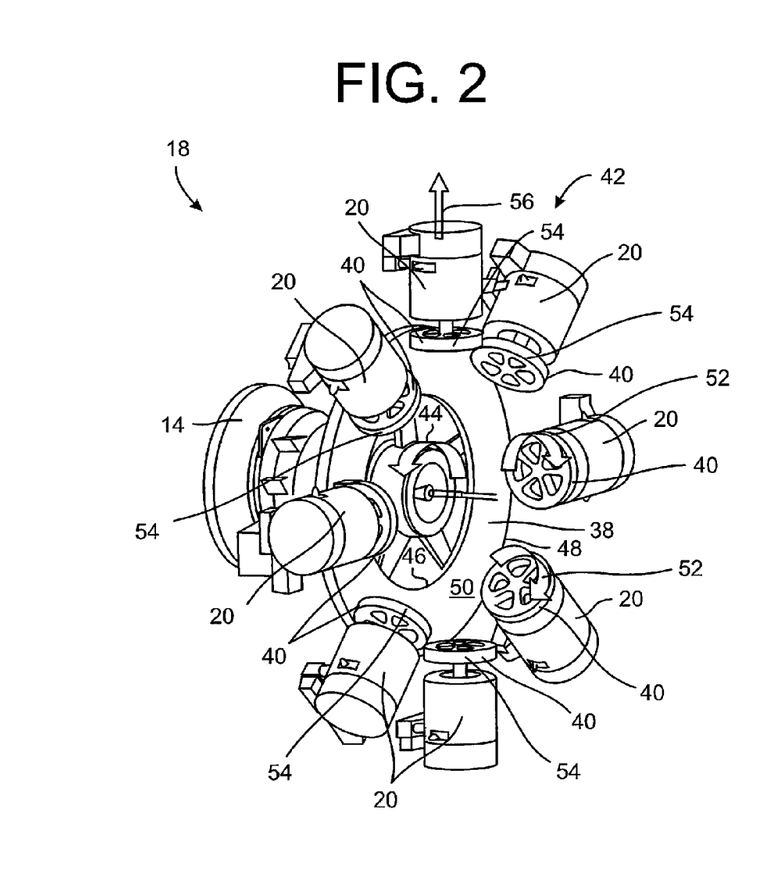
FIGS. 2 and 3 show a first embodiment of a variable speed friction wheel drivetrain for use within the wind turbine of FIG. 1.
Figure 3:
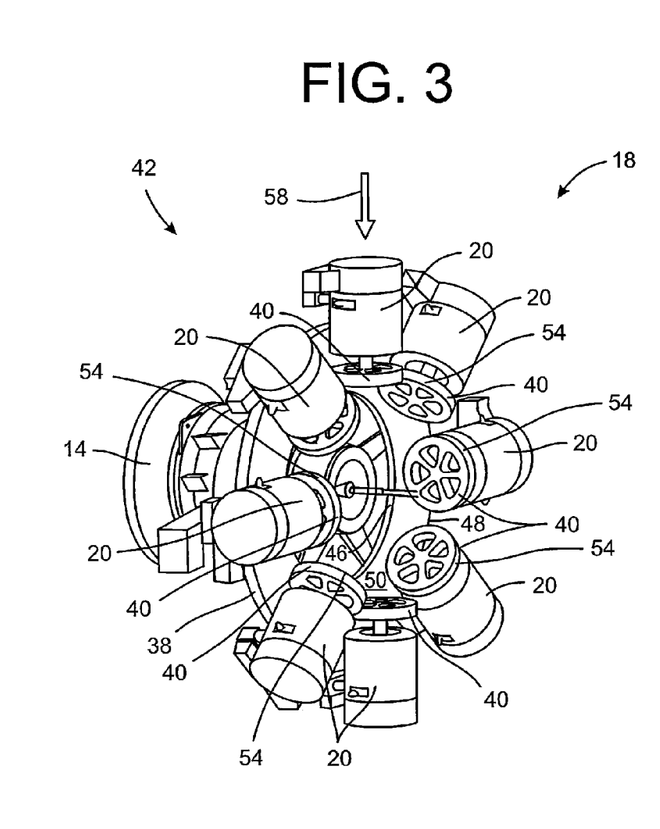

Referring specifically now to FIGS. 2 and 3, a first embodiment of a friction-based variable speed drivetrain 42 is shown, in accordance with at least some embodiments of the present disclosure. FIG. 2 in particular shows a method for increasing the speed ratio of the drivetrain 42, while FIG. 3 shows a method for decreasing the speed ratio thereof. The drivetrain 42 may include the drive wheel 38 mounted onto the main shaft 14 and may drive eight of the driven wheels 40, which in turn may drive eight of the generators 20. As discussed above, the number of the drive and the driven wheels 38, 40 and the generators 20 connected thereto may vary in other embodiments. Furthermore, the drive wheel 38 may be a flat circular disk rotating in the direction indicated by arrow 44 and having an inner wall 46 (e.g., defining an inner radius as measured from a center of the disk), an outer wall 48 (e.g., defining an outer radius that is larger than the inner radius) and a front surface 50 extending between the inner and the outer walls 46, 48. Each of the driven wheels 40, which may be smaller in radius than the drive wheel 38, may be rotating in the direction indicated by arrows 52. Notwithstanding the particular directions of rotation of the drive and the driven wheels 38, 40 presented, this is merely exemplary. The direction of rotation of the drive wheel 38 and the driven wheels 40 may vary in other embodiments. For example, the drive wheel 38 and the driven wheels 40 may both rotate in the same direction (clockwise or counterclockwise) or in opposite directions as well.

In addition, the driven wheels 40 may be arranged symmetrically about the drive wheel 38 and the main shaft 14 in such a way that a rotational axis of each of the driven wheels 40 is not co-axial with a rotational axis of the drive wheel 38. By virtue of arranging the driven wheels 40 non-coaxially about the drive wheel 38 and the main shaft 14, the driven wheels 40 may be translated against the drive wheel 38 in a manner described below to vary the contact location and the effective circumference of the drive wheel 38 and the driven wheels 40 to vary the speed ratio. Translation of the driven wheels 40 with respect to the drive wheel 38 may be achieved by any of variety of mechanical or electromechanical devices, such as, a hydraulic ramp, a rack and pinion, a ball screw, a slider crank, or any other actuator capable of facilitating a linear motion (in case of flat disks) and/or traversing a convex or concave path, via a curved path of motion (in case of concave or convex disks). Furthermore, as shown in FIGS. 2 and 3, the driven wheels 40 may be arranged such that a side surface 54 of each of the driven wheels 40 contacts the front surface 50 of the drive wheel 38 for translation.

In order to increase the overall speed ratio of the drivetrain 42, each of the driven wheels 40 (and the generators 20 connected thereto) may be translated radially outward about the front surface 50 of the drive wheel 38 in the direction indicated by arrow 56 in FIG. 2. Specifically, the driven wheels 40 may be translated from the inner wall 46 defining a smaller radius on the drive wheel 38 towards the outer wall 48 defining a larger radius on the drive wheel 38. By virtue of translating the driven wheels 40 radially about the front surface 50 of the drive wheel 38 from the inner wall 46 towards the outer wall 48, the effective circumference or contact location between the drive and the driven wheels 38, 40, is gradually increased, which in turn increases the speed ratio of the drivetrain 42. The driven wheels 40 may be continuously translated towards the outer wall 48 until the desired speed ratio increase is obtained. Typically, in at least some embodiments, the desired speed ratio increase may be obtained before the driven wheels 40 have translated to the absolute edge of the outer wall 48.

Similarly, as shown in FIG. 3, in order to decrease the overall speed ratio of the drivetrain 42, the driven wheels 40 may be translated radially inward in a direction indicated by arrow 58 from the outer wall 48 towards the inner wall 46, thereby decreasing the effective circumference or contact location of the drive and the driven wheels 38, 40. This decrease in the effective circumference may decrease the overall speed ratio of the drivetrain 42. The driven wheels 40 may be continuously translated from the outer wall 48 towards the inner wall 46 of the drive wheel 38 until the desired speed ratio decrease is obtained. Similar to FIG. 2, the desired decrease in speed ratio may be obtained before the driven wheels 40 reach the absolute center or the edge of the inner wall 46. It will be understood that each of the driven wheels 40 may translate at different speeds (and different directions) and up to a different level, depending upon the output rotational speed required to maintain the output frequency of the generator 20 connected to a particular one of the drive wheel 38. In other words, some of the driven wheels 40 may be translated to increase the speed ratio while some of the driven wheels 40 may be translated to decrease the speed ratio, depending upon the requirements of the generators 20 connected thereto.

Figure 4:
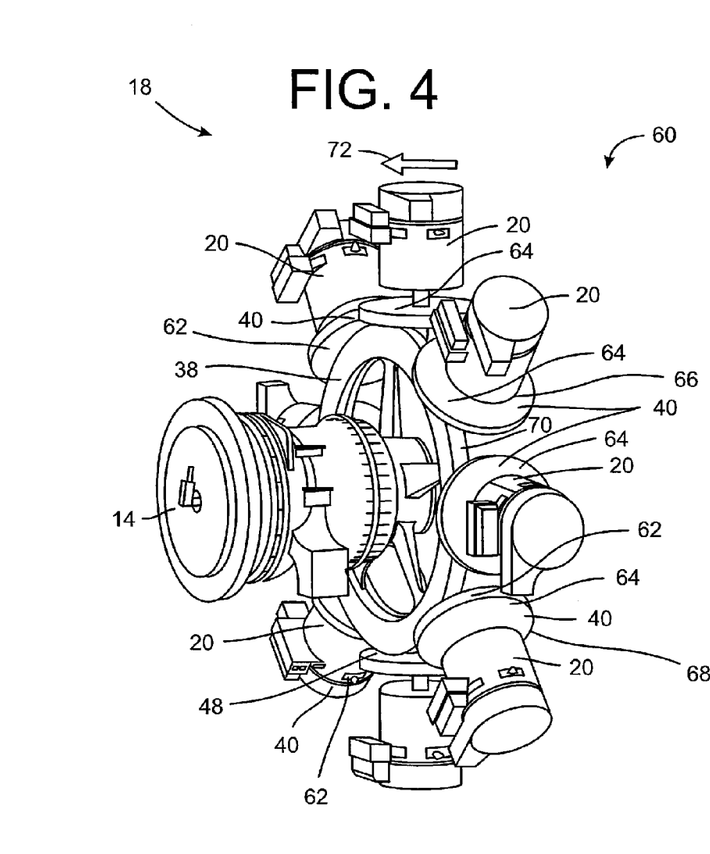
FIGS. 4 and 5 show a second embodiment of the variable speed friction wheel drivetrain for use within the wind turbine of FIG. 1.
Figure 5:
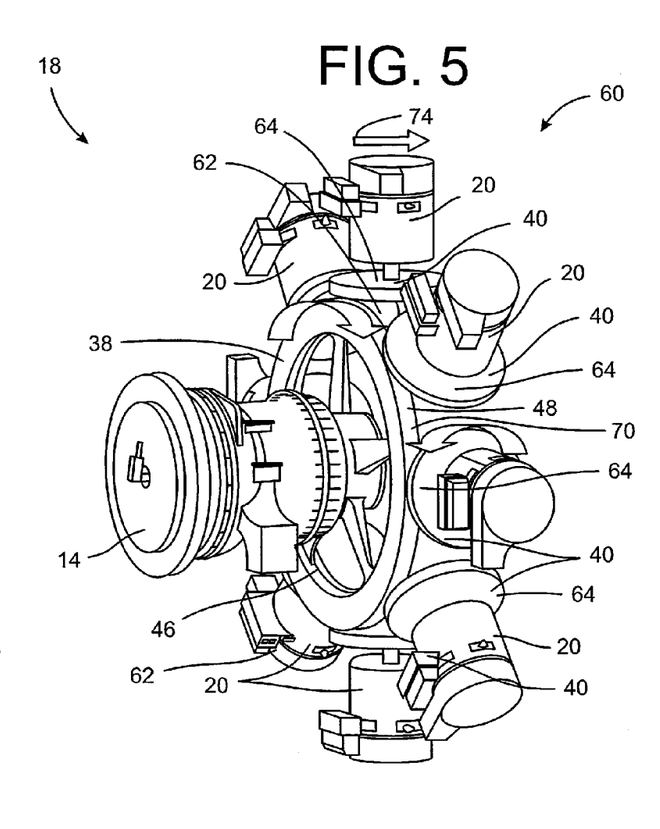

Turning now to FIGS. 4 and 5, a second embodiment of a variable speed ratio speed increasing friction wheel drivetrain 60 is shown, in accordance with at least some embodiments of the present disclosure. In particular, FIG. 4 illustrates a scheme for increasing the speed ratio of the drivetrain 60, while FIG. 5 illustrates a scheme for decreasing the speed ratio thereof. To the extent that FIGS. 4 and 5 are similar to FIGS. 2 and 3, respectively, only the differences between the two embodiments will be discussed. Similar to the embodiment of FIGS. 2 and 3, the driven wheels 40 may be arranged symmetrically and non-coaxially about the drive wheel 38 for translation in FIGS. 4 and 5 and rotating in the direction indicated by the arrows 44, 52. In contrast to the drive wheel 38 of FIGS. 2 and 3, the drive wheel 38 of FIGS. 4 and 5 and, particularly, the front surface 50 (e.g., the portion extending between the inner and the outer walls 46, 48) of the drive wheel 38 may be narrower. Similarly, but in contrast to the driven wheels 40 of FIGS. 2 and 3, the driven wheels 40 of FIGS. 4 and 5 may be flat circular disks and may have broader front and back surfaces 62, 64 extending between an inner wall 66 (defining a smaller inner radius as measured from a center of the disk) and an outer wall 68 (defining a larger outer radius). In further contrast to the embodiments of FIGS. 2 and 3, the driven wheels 40 of FIGS. 4 and 5 may be positioned about the drive wheel 38 such that the front surface 62 of the driven wheel 40 forms a substantially orthogonal friction interface with a side surface 70 of the drive wheel 38 for translation. Thus, while in FIGS. 2 and 3, the drive wheel 38 may be disk-like in shape and the driven wheels 40 may be more wheel-like in shape, in FIGS. 4 and 5, the drive wheel 38 may be more wheel-like in shape and the driven wheels 40 may be disk-like in shape.

Furthermore, the driven wheels 40 may be translated with respect to the drive wheel 38 between the inner and the outer walls 66, 68 of the driven wheels 40 to increase or decrease the speed ratio of the drivetrain 60. For example, and as shown in FIG. 4, the driven wheels 40 may be translated axially upwind in a direction shown by arrow 72 from the outer wall 68 towards the inner wall 66 such that the contact location from the drive wheel 38 to the driven wheels 40 is varied from the larger outer radius of the outer wall along the driven wheels 40 to the smaller inner radius of the inner wall along the driven wheels 38 to increase the overall speed ratio of the drivetrain 60. Similarly, as shown in FIG. 5, the driven wheels 40 may be translated axially downwind in a direction shown by arrow 74 from the smaller radius of the inner wall 66 towards the larger radius of the outer wall 68 until the desired decrease in the speed ratio is obtained. Also similar to the drivetrain 42, it will be understood that each of the driven wheels 40 may be translated at different speeds, different directions and up to different levels in the drivetrain 62. In addition, although the above embodiments of FIGS. 4 and 5 have been described with the driven wheels 40 translating against the drive wheel 38 that is in a fixed position, in at least some embodiments, the drive wheel 38 may be translated in upwind or downwind directions against the driven wheels 40, which may be rotatably fixed, to change the contact radius of the drive wheel 38 on the driven wheels 40 to vary the speed ratio.

Figure 6:
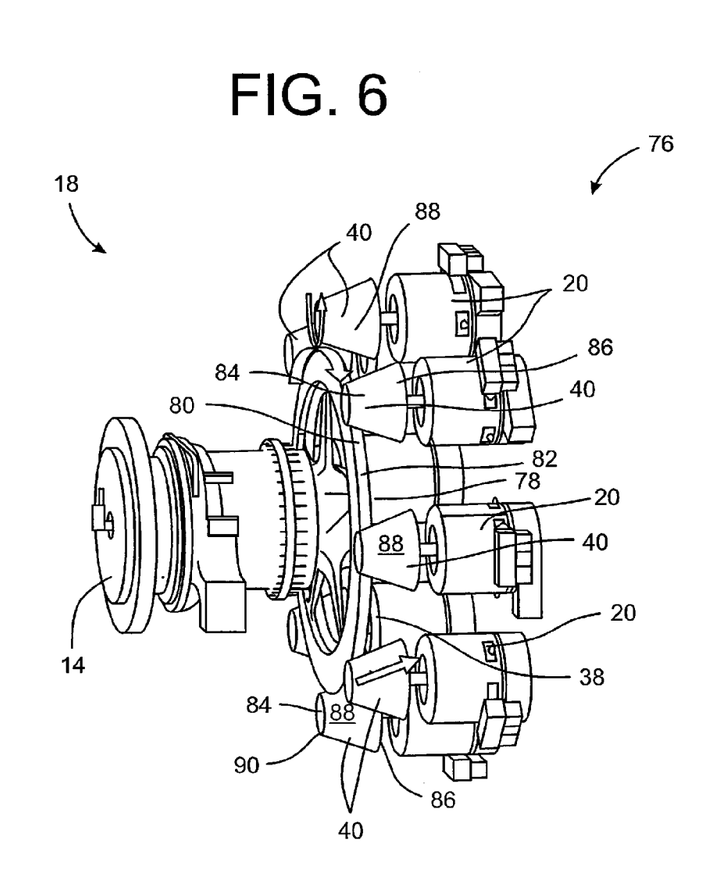
FIGS. 6 and 7 show a third embodiment of the variable speed friction wheel drivetrain for use within the wind turbine of FIG. 1.
Figure 7:
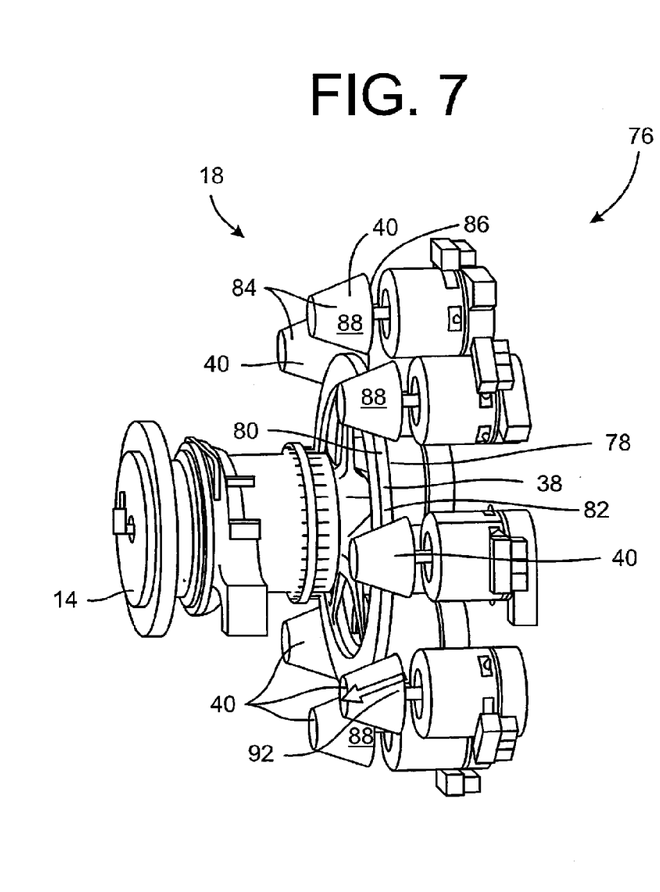

Turning now to FIGS. 6 and 7, a third embodiment of a variable speed ratio speed increasing friction wheel drivetrain 76 is provided in accordance with at least some embodiments of the present disclosure. In particular, FIG. 6 illustrates a scheme for increasing the speed ratio of the drivetrain 76, while FIG. 7 illustrates a scheme for decreasing the speed ratio thereof. As shown, the drivetrain 76 may provide the drive wheel 38 as being mounted onto the main shaft 14 and driving a plurality of driven wheels 40. In contrast to the drive and the driven wheels 38, 40 of FIGS. 2-5, which were circular in shape, the drive and the driven wheels 38, 40 of FIGS. 6 and 7 (and also of FIGS. 8-11) may be conical in shape. Specifically, the drive wheel 38 in FIGS. 6 and 7 may form a conical external friction wheel having a smaller outer radius 78 (as measured from a center of the wheel) and a larger outer radius 80 defining an outer sloping (or conical) surface 82 therebetween. Each of the driven wheels 40 may be conical external friction wheels as well having a smaller outer radius 84 and a larger outer radius 86 defining an outer sloping (or conical) surface 88 therebetween. The conical drive wheel 38 and the driven wheels 40 may be configured such that the slope of the outer sloping surface 82 of the drive wheel 38 matches the slope of the outer sloping surface 88 of the driven wheels 40. Furthermore, the driven wheels 40 may be arranged about the drive wheel 38 and the main shaft 14 in a symmetrical fashion such that a rotational axis of the drive wheel 38 is parallel to a rotational axis of each of the driven wheels 40, although this need not always be the case.

The driven wheels 40 may further be arranged such that the outer sloping surface 88 of the driven wheels 40 contacts the outer sloping surface 82 of the drive wheel 38, which may be translated axially about the drive wheel 38. As shown in FIG. 6, the driven wheels 40 may be translated axially downwind in a direction indicated by arrow 90 along a line of action that is consistent with the slope (or cone) angles of the drive and the driven wheels 38, 40 such that the contact location between the drive wheel 38 to the driven wheels 40 is varied from the larger outer radius 86 to the smaller outer radius 84 along the driven wheels 40 to increase the overall speed ratio of the drivetrain 76. Similarly, as shown in FIG. 7, the driven wheels 40 may be translated upwind along a direction indicated by arrow 92 along a line of action such that the contact location between the drive wheel 38 and the driven wheels 40 vary from the smaller outer radius 84 to the larger outer radius 86 of the driven wheels 40 to decrease the overall speed ratio of the drivetrain 76.

Referring now to FIGS. 8, 8A, 9 and 9A, a fourth embodiment of a variable speed ratio speed increasing friction wheel drivetrain 94 is provided in accordance with at least some embodiments of the present disclosure. In particular, FIGS. 8 and 8A illustrate a scheme for increasing the speed ratio of the drivetrain 94, while FIGS. 9 and 9A illustrate a scheme for decreasing the speed ratio thereof. FIGS. 8A and 9A show partial cross-sectional views of FIGS. 8 and 9, respectively. To the extent that FIGS. 8, 8A, 9 and 9A are similar to the embodiment of FIGS. 6 and 7, only the differences between the two embodiments will be discussed. Similar to the drivetrain 76 of FIGS. 6 and 7, the drivetrain 94 shows a conical configuration of the drive wheel 38 and the driven wheels 40, which may be arranged about the drive wheel 38 such that the rotational axis of the drive wheel 38 is parallel (although this may vary) to the rotational axes of the driven wheels 40. However, in contrast to the drivetrain 76 in which the driven wheels 40 translate along the outer sloping surface 82 of the drive wheel 38, in the drivetrain 94, the driven wheels 40 translate along an inner sloping surface 96 of the drive wheel 38.

Accordingly, and as shown in the cross-sectional views of FIGS. 8A and 9A, the drive wheel 38 of the drivetrain 94 may be a conical internal friction wheel having a smaller inner radius 98 and a larger inner radius 100 defining the inner sloping surface 96. The width of the drive wheel 38 of the drivetrain 94 may be broader (but, the width of the friction interface therebetween may still be the same) than the width of the drive wheel 38 of the drivetrain 76. The driven wheels 40 of the drivetrain 94 may be similar (e.g., conical external friction wheels) to the driven wheels 40 of the drivetrain 76 having the smaller outer radius 84, the larger outer radius 86 and the outer sloping surface 88. The slope of the inner sloping surface 96 of the drive wheel 38 may match the slope of the outer sloping surface 88 of the driven wheels 40. As mentioned above, the slopes, as well as the height of the drive and the driven wheels 38, 40 may be determined by the speed ratio of the drivetrain 94 that is desired. In addition, the driven wheels 40 may be positioned with respect to the drive wheel 38 such that the outer sloping surface 88 of the driven wheels 40 contacts the inner sloping surface 96 of the drive wheel 38 for translation.

In order to increase the overall speed ratio of the drivetrain 94, as shown in FIG. 8, the driven wheels 40 may be translated downwind in a direction indicated by arrow 102 along a line of action that is consistent with the sloped surface angles of the drive and the driven wheels 38, 40 such that the contact location from the drive wheel 38 to the driven wheels 40 is varied from the larger outer radius 86 to the smaller outer radius 84 along the driven wheels 40. Similarly, to decrease the overall speed ratio of the drivetrain 94, as shown in FIG. 9, the driven wheels 40 may be translated upwind in a direction indicated by arrow 104 such that the contact location of the drive wheel 38 varies from the smaller outer radius 84 towards to the larger outer radius 86 along the inner sloping surface 96 of the drive wheel 38. As with the embodiments of FIGS. 2-5, the driven wheels 40 of FIGS. 6-9 may translate at different speeds, up to different levels and in different directions depending upon the rotational speed required by the generators 20 associated therewith.

Turning to FIGS. 10 and 11, a fifth embodiment of a variable speed ratio speed increasing friction wheel drivetrain 106 is provided in accordance with at least some embodiments of the present disclosure. In particular, FIG. 10 illustrates a scheme for increasing the speed ratio of the drivetrain 106, while FIG. 11 illustrates a scheme for decreasing the speed ratio thereof. Furthermore, the drivetrain 106 is similar to the drivetrain 76 of FIGS. 6 and 7 in that the drivetrain 106 employs a conical external friction wheel for the drive wheel 38 and conical external friction wheels for the driven wheels 40. However, in contrast to the drivetrain 76 in which the driven wheels 40 and the generators 20 connected thereto translate directly against the drive wheel 38, in the drivetrain 106, the drive wheel 38 translates against the driven wheels 40 through a translatable idler wheel 108. By virtue of utilizing the translatable idler wheel 108 between each of the driven wheels 40 and the drive wheel 38, only the idler wheel 108 is required to move during speed ratio transitions and the driven wheels 40 as well as the generators 20 may remain stationary. Advantageously, by avoiding the need to translate the generators 20, the design and complexity of the generators 20 (and the extra cabling used to account for the translation) may be reduced. It will be understood that while the translatable idler wheels 108 have been shown with respect to the embodiment of FIGS. 10 and 11, similar configurations may be employed with any of the aforementioned embodiments of FIGS. 2-9.

Thus, the outer sloping surface 88 of the driven wheels 40 contacts an outside diameter 110 of one of the translatable idler wheels 108, which in turn contacts the outer sloping surface 82 of the drive wheel 38. As shown in FIG. 10, the translatable idler wheels 108 may translate along the outer sloping surface 88 of the driven wheels 40 upwind in a direction indicated by arrow 112 from the larger outer radius 86 to the smaller outer radius 84 of the driven wheels 40 to increase the speed ratio. Specifically, as the translatable idler wheels 108 translate along the outer sloping surface 88 of the driven wheels 40, it also translates along the outer sloping surface 82 of the drive wheel 38. This translation occurs along a line of action that is consistent with the sloped surface angles of the drive and driven wheels 38, 40 such that the contact location from the drive wheel 38 to the driven wheels 40 is varied from the larger outer radius 86 towards the smaller outer radius 84 along the driven wheels 40, and from the smaller outer radius 78 to the larger outer radius 80 of the drive wheel 38 to increase the overall speed ratio of the drivetrain 106. Similarly, as shown in FIG. 11, the translatable idler wheels 108 may translate downwind in a direction indicated by arrow 114 along a line of action that is consistent with the sloped surface angles of the conical drive and driven wheels 38, 40 such that the contact location from the drive wheel 38 to the driven wheels 40 is varied from the smaller outer radius 84 towards the larger outer radius 86 along the driven wheels 40 and from the larger outer radius 80 to the smaller outer radius 78 of the drive wheel 38 to decrease the overall speed ratio of the drivetrain 106. Again, each of the translatable idler wheels 108 may translate at different speeds, in different directions and up to different levels to either increase or decrease the speed ratio of the drivetrain 106.

Figure 12:
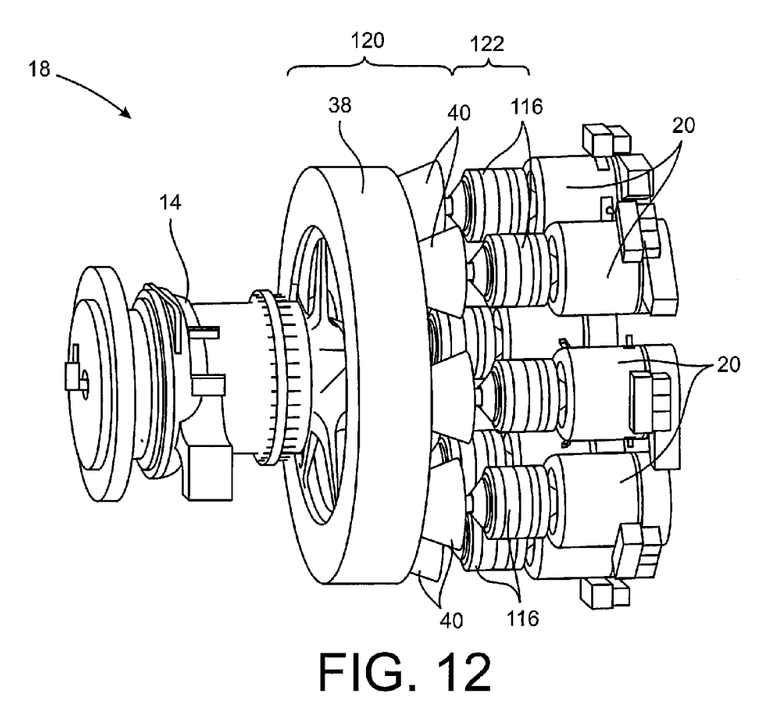
FIGS. 12 and 13 show partial perspective views of a drivetrain that may be used in conjunction with the hybrid friction wheel embodiments of the present disclosure.
Figure 13:
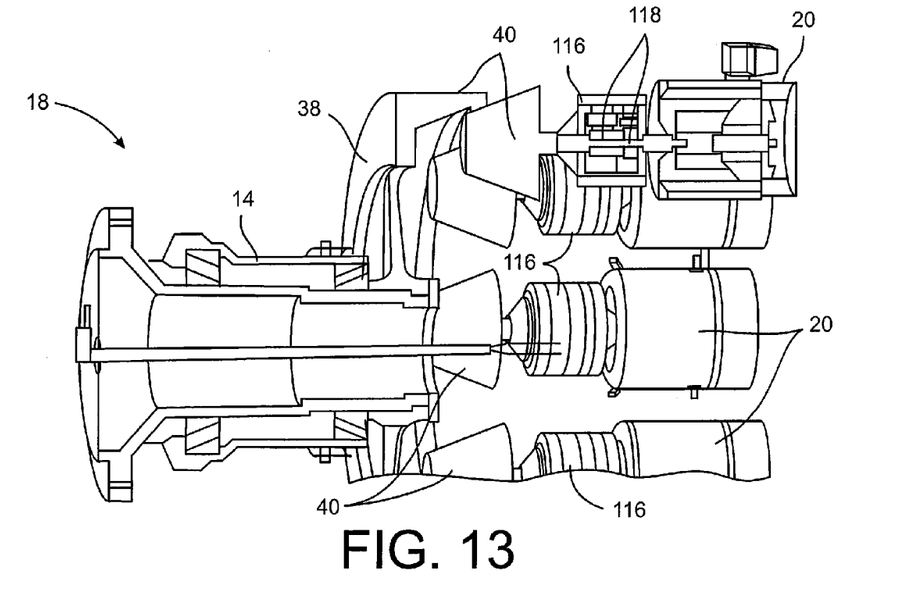
Figure 14:
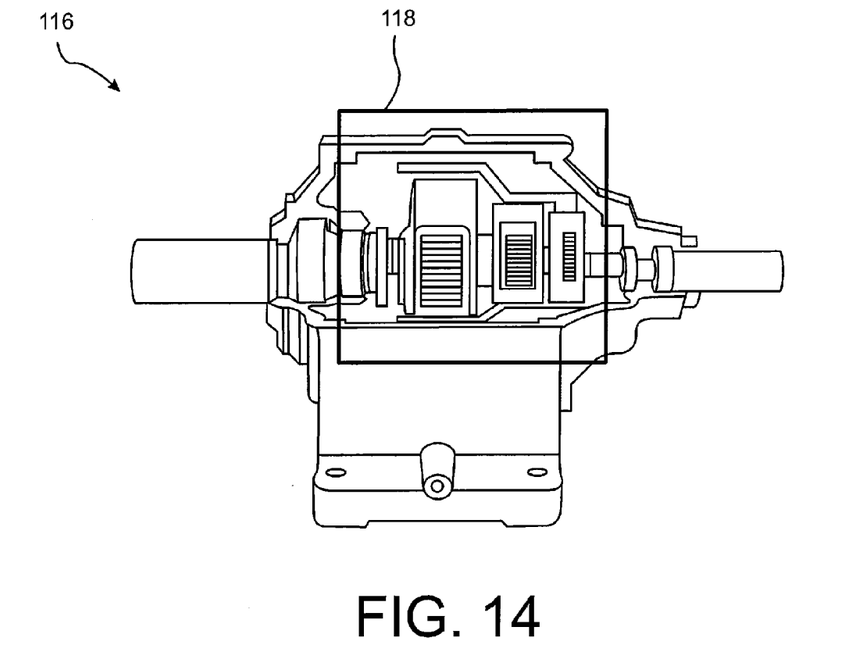
FIGS. 14 and 15 show commercial gearboxes that may be used in conjunction with the drivetrain of FIGS. 12 and 13.
Figure 15:
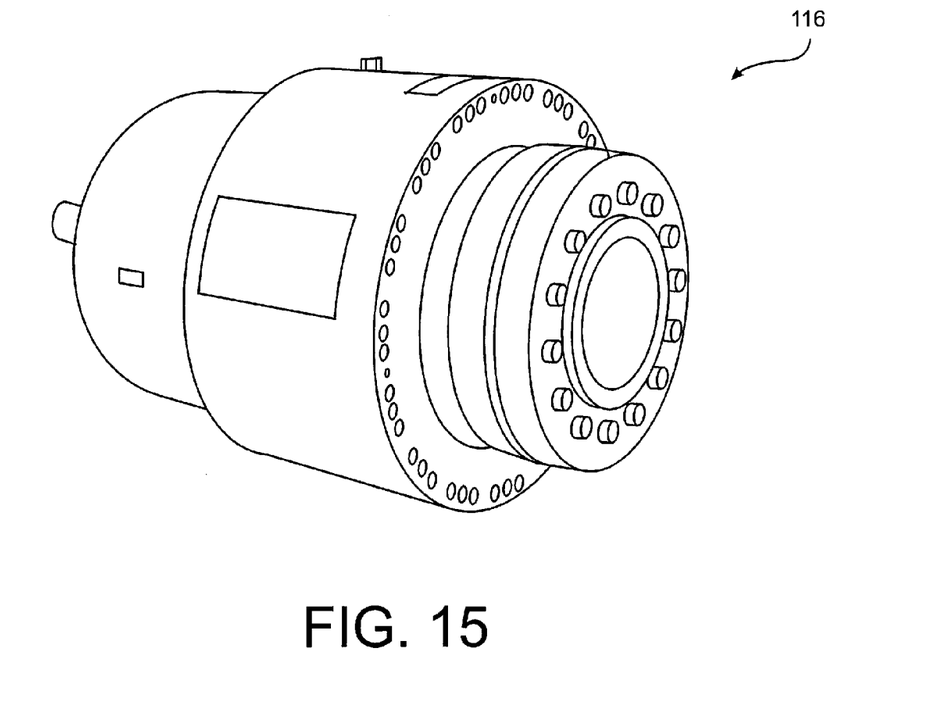

Referring now to FIGS. 12-15, one exemplary drivetrain 18 is provided which may be used in conjunction with the hybrid friction wheel embodiments disclosed herein. As shown in FIGS. 12 and 13, the drivetrain 18 may include elements similar to those of FIGS. 8, 8A, 9 and 9A. For example, the drivetrain 18 may include a substantially conical drive wheel 38 that is coupled to and rotatably driven by the main shaft 14, as well as a plurality of substantially conical driven wheels 40 in frictional communication with the drive wheel 38. More specifically, the drive wheel 38 may take the form of a conical internal drive wheel 38 such that the driven wheels 40 communicate with an inner surface thereof. As with previous embodiments, each driven wheel 40 may be sized to be substantially smaller in circumference than the drive wheel 38 such that lower rotational speeds at the drive wheel 38 may be converted into higher rotational speeds at the driven wheels 40. Additionally, by providing a plurality of driven wheels 40 per drive wheel 38, higher rotational torque in the drive wheel 38 may be distributed or divided among the driven wheels 40 and reduced to a lower rotational torque for transmission through each driven wheel 40. The reduced torque and increased rotational speed of the driven wheels 40 may further be communicated to a series of gearboxes 116. Specifically, each of the driven wheels 40 may be coupled to a gearbox 116 rather than directly to a generator 20 as in previous embodiments. Among other things, the gearbox 116 may comprise one or more planetary gear sets 118, as shown for example in FIGS. 14 and 15, that are configured to further increase a rotational speed received from the associated driven wheel 40, and to source the increased rotational speed to the attached generator 20. In still further alternative embodiments, the gearbox 116 may comprise parallel shaft gearboxes having spur or helical gears, angle gearboxes having bevel, spiral bevel, hypoid or worm gears, or any other gearbox configuration suitable for providing an increased rotational speed to a generator input.

In such a way, the drivetrain 18 of FIGS. 12 and 13 may provide a multi-stage, for example, a dual-stage, speed increaser to the associated wind turbine 2. More specifically, the drivetrain 18 may include a first stage speed increaser 120, essentially comprising the drive wheel 38 and the driven wheels 40, as well as a second stage speed increaser 122, essentially comprising at least the gearbox 116. The first stage speed increaser 120 may be adapted for use with relatively lower speed, higher torque operations, such as when the rotor 8, hub 12, and thus, the main shaft 14 and the drive wheel 38 rotate in response to wind energy received at the rotor blades 10. Correspondingly, the second stage speed increaser 122 may be adapted for use with relatively higher speed, lower torque operations, such as when the driven wheels 40 rotate at increased speeds in response to its contact with the drive wheel 38. It will be understood that the speed increaser of the drivetrain 18 may similarly incorporate more than two stages or even a single stage speed increaser based on the desired application. Additionally, while the embodiments of FIGS. 12 and 13 depict a conical internal friction drive wheel 38, in alternative embodiments, the drive wheel 38 may take the form of the conical external friction drive wheel 38 of FIGS. 6 and 7. In other alternatives, the drive wheel 38 and/or driven wheels 40 may be substantially circular or disk-shaped as in FIGS. 2-5 rather than conical. In still further alternative embodiments, the drivetrain 18 of FIGS. 12 and 13 may be modified to employ, for example, the idler pulleys 108 of FIGS. 10 and 11.

Thus, the present disclosure sets forth a drivetrain for a wind turbine which combines a more efficient and reliable first stage speed increaser with a lighter and more cost-effective second stage speed increaser. Specifically, the first stage speed increaser provides a friction wheel configuration which places a plurality of driven wheels in contact with the drive wheel such that the rotational speed is effectively increased and the rotational torque ultimately delivered to each generator is decreased, all while increasing the overall tolerance to any misalignments which may occur within the drivetrain during use. The second stage speed increaser provides gearboxes disposed between the driven wheels and the generators so as to eliminate the need for large generators, assembly housings and gear sets, all of which are heavy, costly and much less tolerant to misalignment. As the first stage speed increaser is much more efficient at lower operating speeds, and as the second stage speed increaser is much lighter, smaller and less costly to implement, the disclosed drivetrain may significantly improve the performance and reliability for all of low speed, moderate speed and high speed operations within a wind turbine while reducing costs.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A drivetrain for a wind turbine, comprising:
   a first stage speed increaser adapted for low speed operations, the first stage speed increaser including at least one drive wheel being rotatably driven by a main shaft of the wind turbine and one or more driven wheels in frictional communication with the drive wheel; and
   a second stage speed increaser adapted for moderate and high speed operations, the second stage speed increaser including one or more gearboxes coupled to each of the one or more driven wheels and one or more generators coupled to each of the one or more gearboxes, the one or more gearboxes including a planetary gear set.

2. The drivetrain of claim 1, wherein each of the one or more driven wheels, the one or more gearboxes, and the one or more generators is selectively translatable relative to the drive wheel so as to move a friction interface formed between the drive wheel and each driven wheel, and effectively vary a speed ratio therebetween.

3. The drivetrain of claim 1, wherein each of the one or more driven wheels is of a substantially smaller circumference than the drive wheel so as to convert low speed, high torque rotations of the drive wheel into higher speed, lower torque rotations of the one or more driven wheels.

4. The drivetrain of claim 1, wherein each of the one or more driven wheels includes one of a substantially conical surface and a circular surface which frictionally communicates with a corresponding surface of the drive wheel.

5. The drivetrain of claim 1, wherein the planetary gear set of each of the one or more gearboxes is configured to increase a rotational speed of each of the one or more driven wheels coupled thereto and supply the increased rotational speed to each of the one or more generators coupled thereto.

6. The drivetrain of claim 1, wherein the first and second stage speed increasers are configured to substantially increase the tolerance for any misalignment therein and reduce generator size.

7. A drivetrain for a wind turbine, comprising:
   at least one drive wheel rotatably driven by a main shaft of the wind turbine;
   one or more driven wheels forming a friction interface with and being rotatably driven by the drive wheel;
   one or more gearboxes coupled to each of the one or more driven wheels; and one or more generators coupled to each of the one or more gearboxes, the one or more gearboxes including a planetary gear set.

8. The drivetrain of claim 7, wherein the friction interface is movable so as to effectively vary a speed ratio between the drive wheel and the driven wheels.

9. The drivetrain of claim 7, wherein each of the one or more driven wheels, the one or more gearboxes, and the one or more generators are translatable relative to the drive wheel so as to effectively vary a speed ratio between at least the drive wheel and the driven wheels.

10. The drivetrain of claim 7, wherein each of the one or more driven wheels is of a substantially smaller circumference than the drive wheel so as to convert low speed, high torque rotations of the drive wheel into higher speed, lower torque rotations of the driven wheels.

11. The drivetrain of claim 7, wherein each of the one or more driven wheels includes a substantially conical surface which communicates with a corresponding surface of the drive wheel.

12. The drivetrain of claim 7, wherein each of the one or more driven wheels includes a substantially circular surface which communicates with a corresponding surface of the drive wheel.

13. The drivetrain of claim 7, wherein the planetary gear set of each of the one or more gearboxes is configured to increase a rotational speed of each of the one or more driven wheels coupled thereto and supply the increased rotational speed to each of the one or more generators coupled thereto.

14. The drivetrain of claim 7, wherein the drive wheel and the driven wheels form a first stage speed increaser adapted for low speed operations, the first stage speed increaser being configured to convert low speed, high torque rotations of the drive wheel into higher speed, lower torque rotations of the driven wheels.

15. The drivetrain of claim 7, wherein each of the one or more gearboxes form a second stage speed increaser adapted for moderate and high speed operations, each of the one or more gearboxes including a planetary gear set configured to increase a rotational speed of each of the one or more driven wheels coupled thereto and supply the increased rotational speed to each of the one or more generators coupled thereto.

16. A wind turbine, comprising:
a hub;
a main shaft rotating with the hub; and
a drivetrain coupled to the main shaft, the drivetrain comprising:
a first stage speed increaser adapted for low speed operations, the first stage speed increaser including a drive wheel being driven by the main shaft and a plurality of driven wheels in frictional communication with the drive wheel; and
a second stage speed increaser adapted for moderate and high speed operations, the second stage speed increaser including a gearbox coupled to each driven wheel and a generator coupled to each gearbox, the gearbox including a planetary gear set.

17. The wind turbine of claim 16, wherein each of the driven wheels, gearboxes, and generators is selectively translatable relative to the drive wheel so as to move a friction interface formed between the drive wheel and each driven wheel, and effectively vary a speed ratio therebetween.

18. The wind turbine of claim 16, wherein each driven wheel is of a substantially smaller circumference than the drive wheel so as to convert low speed, high torque rotations of the drive wheel into higher speed, lower torque rotations of the driven wheels.

19. The wind turbine of claim 16, wherein each driven wheel includes one of a substantially conical surface and a circular surface which frictionally communicates with a corresponding surface of the drive wheel.

20. The wind turbine of claim 16, wherein the planetary gear set is configured to increase a rotational speed of the associated driven wheel and supply the increased rotational speed to the associated generator.

* * * * *